United States Patent Office 2,794,743
Patented June 4, 1957

2,794,743

ENZYME-CONTAINING POWDER AND ENZYME-MODIFIED PRODUCT THEREOF

Merle G. Farnham, Waukesha, Wis., assignor to Dairyland Food Laboratories, Inc., Waukesha, Wis., a corporation of Wisconsin No Drawing. Application June 30, 1952,
Serial No. 296,497

9 Claims. (Cl. 99—56)

This invention relates to improvements in processes for, respectively, making an enzyme-containing powder and a whole milk powder modified by enzyme action, and in the enzyme and the milk powders resulting from the processes.

In the manufacture of many food products, such as milk chocolate, bakery goods and the like, it is desired to have a milk-like or butter flavor in the finished product. In many processes for preparing foodstuffs, it is difficult to produce such flavor or the flavor is unstable and disappears due to the conditions under which the final product is made. In some cases the final product even becomes disagreeable to many persons. Efforts to obtain a permanent and pleasing flavor regardless of the severity of the conditions for making a finished product or of the aging of the finished product, have so far been unsuccessful where milk, cream or butter was used.

Patents 1,966,460 and 2,169,278 issued to H. E. Otting on July 17, 1934 and August 15, 1939, respectively, disclose a process for making and using a whole milk powder in which the milk is modified by action of an enzyme such as steapsin obtained from the pancreatic glands of edible animals. It was found, however, that the enzymes mixture disclosed in the above patents did not produce a milk powder which would secure the desired flavor or a stable flavor. The patented milk powders were difficult to prepare to a given standard which made both preparation of the milk powders and their final use very difficult and required continuous supervision in making the final products. In some instances, which are believed to have been due to the source of the enzyme or enzyme mixtures, bitter or "off" flavors were developed in either the milk powders or the final product, and particularly in chocolate. Whatever the reason for the poor flavors or instability of the flavors, efforts to use the Otting products did not meet with material commercial success.

If an enzyme composition is used which has both lipolytic and proteolytic qualities, such as disclosed in Patent 2,531,329 issued to the present applicant on November 21, 1950, it has been found that an enzyme-containing composition may be made in powder form which can be readily standardized to a given value and that the action thereof on milk can be readily controlled to yield a standardized milk powder which avoids all of the prior difficulties in using the milk powder in a final product.

It has also been found that the present enzyme powder has a lipolytic action producing relative higher proportions of the $C_6$ and higher fatty acids (especially caproic and caprylic acids) than is usual in the lipolysis of milk products, that proportions of $C_4$ and lower fatty acids (especially butyric and propionic acids) to the $C_6$ and higher fatty acids is high and that a higher butyric acid content relative to the $C_6$ and higher acids, is obtained than would be expected, the ratio averaging 35:62. It is now believed that the desirable flavor of the present product and the stability of the flavor is in large part due to the ratio of the $C_4$ and lower fatty acids to the group of $C_6$ and higher fatty acids.

It is therefore one object of the present invention to produce an enzyme composition in powder form which will have such action in food products capable of lipolysis as to produce a higher proportion of $C_6$ and higher acids than of the $C_4$ and lower acids, but in which the $C_4$ is the greater component of its group.

Another object of the invention is to produce an enzyme-containing composition in powder form which can be readily standardized and in which the amount required to secure a given quality of the enzyme modified material, can be readily calculated.

Another object of the invention is to produce a milk powder in which the ratio of butyric acid to all other acids is substantially 1:2.

Another object of the invention is to produce an enzyme-modified milk powder in which the milk requires only treatment which is readily performed by equipment found in the large majority of milk-handling plants, and in which such equipment is operated under conditions within the normal range of the equipment operating conditions.

Another object of the invention is to produce an enzyme-modified milk powder as a product in which the proportions of the $C_4$ and lower fatty acids to the $C_6$ and higher fatty acids is in the ratio of approximately 7:12.

Another object of the invention is to produce an enzyme-modified whole milk powder which has the quality of complete stability for periods of at least six months without deterioration, which is easily standardized for the major flavor producing components thereof and which will produce a given flavor without special control in use of the product in accordance with a predetermined formulation for a given final product.

The enzyme-containing powder is made from the glands defined in the above-identified Farnham patent and which, generally, may be defined as the edible tissues taken from between the base of the tongue and the trachea of young milk-fed mammals, such as calves and kids. The glands are ground to pass ¼ to ½ inch holes in a grinder plate. The ground glands are thoroughly mixed with 5% by weight of sodium chloride to inhibit bacterial action. The mixture may be held in cold storage (40–48° F.) if the enzyme-containing powder is not to be made at once. Equal weights of the ground and salted glands and of skim milk powder (2% moisture) are mixed and ground to homogeneity, the milk powder being made by either the roller or spray methods. The skim milk powder serves as a diluent to facilitate future drying of the mixture and grinding to small particle size. Use of milk powder as the diluent minimizes the amount of non-protein solids in the final product of this application.

The mixed meat is then "chopped" in a hammermill with the blades reversed for further mixing of the meat and milk powder and to break up any agglomerated masses. The mixture is then dried at not more than 110° F. with sufficient circulation of the air to keep the temperatures of all parts of the mixture substantially uniform, the drying being continued until approximately 36% moisture (based on total weight) has been removed. Although the mixture may be dried at a temperature as high as 110° F., it is preferable to keep the temperature approximately 105° F. The final result to be achieved in the drying step is to remove as much as possible of the water from the meat fraction of the mixture and which may be in the meat or may have been absorbed therefrom by the milk powder. The milk powder itself has only approximately 2% water content which cannot be removed at a temperature range up to 110° F. Under some atmospheric conditions, it is necessary to continue the drying process for as much as 48 hours to obtain a sufficiently dry material, but 24 hours is usually sufficient under average atmospheric conditions.

The dried meat and skim milk powder mixture is then pulverized in a hammer mill using a 40 mesh screen, to the particle sizes usual in milk powder. In the present instance, the particles are substantially all of such size as to pass a 60 mesh screen.

The enzyme activity of the material varies dependent on a considerable number of factors, such as the physical condition of the parent animals, the age of the animals from which the glands are obtained, the climatic conditions under which the animals are raised, the season of the year, and other factors. Hence, it is necessary to test each batch of the enzyme-containing powder for potency to maintain a given standard. A sufficient number of samples of the dried powder is suspended in water so that an average test value taken from such samples will produce a value per unit of weight from which it is possible to calculate the weight of enzyme powder required to secure a standardized final product. At least three samples of not less than 1 gm. and varying by 1 gm., are placed in 100 cc. of water. The samples in water are allowed to stand from one-half to one hour so that the material may take up as much moisture as possible and the samples are then shaken sufficiently to bring the suspension to a homogeneous condition.

While the powder samples are soaking up water, a butter-fat containing substrate is prepared. Homogenized cream of any known butter-fat content may be used but it has been found that 18% butter-fat cream is satisfactory and such cream is readily obtained. The cream is sterilized by bringing it to the boiling point and is then cooled to room temperature. A preservative to prevent bacterial growth is then added to the cream, the preservative preferably being formaldehyde in the proportion of 1 p. p. m.

1 cc. of each of the samples of powder suspension is mixed with 75 cc. of the substrate and is immediately titrated to determine total acidity before the butter-fat in the substrate can be affected by the enzyme. Specifically, 25 cc. aliquot portions of each of the test mixtures are mixed with 5 cc. of absolute ethyl alcohol or 99% isopropyl alcohol. The samples are then titrated to neutrality with N/20 sodium hydroxide in water solution to determine original acidity, phenolphthalein being used as the indicator. The samples are then incubated at 42° C. (approximately 107.6° F.) for exactly 22 hours to obtian lipolysis of the butter-fat. The incubated samples are then again titrated with N/20 sodium hydroxide to determine the increase in total acidity. The difference between the original titration and the total increase in titratable acidity is a measure of the enzyme activity. The degree of enzyme activity of course determines, in part, the amount of enzyme powder to be used for a given weight of milk but it will be understood that the composition of the milk itself and the processing conditions under which the milk powder is made, also affect the final result. It is therefore impractical to state any particular quantity of enzyme as required for a given quantity of milk. Generally, it has been found satisfactory to use 8.8 pounds of enzyme powder per 1000 pounds of milk condensed to 36% total solids.

The whole milk to be modified is condensed to 30–38% total solids by the usual procedure for condensing milk, 36% solids being preferred as best for the enzyme action and for spray drying. The condensed milk is preheated to 170° F. for fifteen minutes to destroy any natural lipase in the milk, the quantity of natural lipases varying in different milksheds and in different seasons. The condensed milk is then homogenized at a temperature sufficient to keep the fat liquid, 135° being suitable, and at a pressure of only 500 p. s. i., and is then cooled to 115° F. which is a desirable incubation temperature. It will be noted especially that the homogenizing pressure is much less than the pressures of 2,000–3,000 p. s. i. usual in homogenizing milk. The milk fat accordingly retains its original particle size and does not coalesce as is the case when higher pressures are used and after the fatty acids are developed.

The enzyme powder described above is separately suspended in water (preferably in the quantity of ½ gallon of water per lb. of enzyme powder) in a proportion dependent on the action of the powder and the viscosity desired in the mixture of powder and milk, 335 pounds of enzyme powder to yield a total volume of 220 gals. having generally been found satisfactory. The enzyme powder suspension is homogenized or made uniform at the incubation temperature preferred (115° F.) and such homogenization can readily be obtained if the suspension is pumped into the condensed milk tank as by a centrifugal pump and if the milk tank is equipped with an agitator. The mixture of enzyme powder suspension and condensed milk is immediately sampled to obtain samples before any enzyme activity has occurred for determining the original acidity of the mixture. A sufficient number of samples is again taken to secure a representative average value, the samples being preferably 25 cc. each. 5 cc. of either absolute ethyl alcohol or 99% isopropyl alcohol and an acidity indicator, such as phenolphthalein, are mixed with each of the samples. The samples are then titrated with N/20 sodium hydroxide in water solution to determine the original acidity of the mixture.

The mixture of the enzyme powder and condensed milk is then incubated at a suitable temperature (115° F.) until at least a given value of total acids is reached. The increase in acidity is preferred to be that equivalent to 2.33 cc. of N/20 sodium hydroxide per gallon of total milk solids. Specifically, an increase of 21 cc. of N/20 sodium hydroxide ($\pm 5\%$) per 25 cc. of 36% total milk solids, has been found to be a suitable final value or standardization point. The maximum total acid developed cannot be more than the quantity which would cause coagulation of the mixture when the mixture is heated to 150° F. for up to five minutes for a purpose which will appear hereinafter.

Periodically, and at least at intervals of one hour, samples of the mixture are titrated with N/20 sodium hydroxide as above described, to determine the increase in titrable acidity as a measure of the degree of modification of the milk by the enzyme. As the total titrable acids approach the above standardization point, the mixture is heated sufficiently to reduce enzyme activity as by raising the temperature of the mass to 130° F. as rapidly as possible. When the total acidity reaches the preferred standardization value, the modified condensed milk is heated to a sufficient temperature (150° F.) and is held for a sufficient time (two minutes) to insure inactivation of all of the enzyme thus avoiding the possibility of further and undesired enzyme action in the final product.

The enzyme modified milk is then homogenized at high pressure such as 2000 p. s. i., is cooled to a temperature (50° F.) at which the agglomeration of the butter-fat will not occur and may then be either immediately spray-dried or held in cooled storage (not less than 50° F.) until convenient for spray-drying. The milk should be spray-dried to avoid localized over-heating which would caramelize or otherwise change the milk solids, and would volatize some fatty acids with loss of flavor in the milk powder and such drying is difficult to achieve with a roller type drier.

It is desirable to cool the finished milk powder before packaging to avoid all possibility that the inner portions of powder in a package (such as large drums) might be damaged by high temperature or might take a considerable time in reaching the atmospheric temperature of storage. It has been found that cooling to approximately 100° F. is adequate and that the milk powder can be stored under usual storage conditions for food products, when packaged at 100° F., for at least six months with no indication of deterioration.

The enzyme modified whole milk powder has total solids of 98% of which 28½% is butter-fat, dependent on the degree of drying which may vary in different equipment or may be due to factors in the milk originally used.

The enzyme modified whole milk powder may be used by various methods to produce the desired flavor in food products and incidentally provides the product with some of the desired milk solids content, and especially butter-fat. In making chocolate, for example, the milk powder is added to the chocolate liquor to replace a portion of the total milk solids, in the proportion believed by the particular manufacturer to produce the best flavor. It has been found that the milk flavor of chocolate may be varied from a very bland flavor to a relatively strong flavor by using as little as 1% to as much as 5% of the milk powder. Up to 50% of the milk powder (based on the weight of finished chocolate) usually used in making chocolate, may be replaced by the present product without obtaining flavors so high as to be disagreeable to any considerable number of persons.

The differences in flavor obtained as compared to that obtained when using ordinary whole milk powder, is believed to be due to the differences in the percentages of different groups of fatty acids produced in the present milk powder as compared to the same acids of ordinary milk powder. The following table illustrates the percentages of $C_3$ and lower fatty acids and of $C_6$ and higher fatty acids in the present product, and of butyric acid, as determined by chromatographic analysis. (The values for fatty acids are given in terms of cc. N/100 sodium hydroxide used in titration.)

*Table I*

| Lot No. | (cc. of NaOH) Value for total fatty acids | Percentages of fatty acids | | |
|---|---|---|---|---|
| | | $C_3$ and lower | butyric ($C_4$) | $C_6$ and higher |
| (N/100 NaOH IN ETHYL ALCOHOL) | | | | |
| 96 | 34.26 | 1.97 | 39.73 | 58.18 |
| 98 | 33.23 | 1.40 | 35.15 | 63.45 |
| 101 | 30.09 | 2.88 | 33.97 | 63.13 |
| 102 | 23.84 | 2.31 | 35.56 | 62.10 |
| 102 | 25.26 | 2.65 | 34.11 | 63.30 |
| 105 | 38.86 | 3.25 | 32.73 | 63.98 |
| Average | 30.92 | 2.61 | 35.32 | 63.32 |
| (N/100 NaOH IN 99% ISOPROPYL ALCOHOL) | | | | |
| 96 | 30.45 | 2.25 | 40.91 | 56.81 |
| 98 | 28.69 | 1.60 | 40.92 | 57.44 |
| 98 | 31.23 | 2.04 | 41.25 | 56.90 |
| 101 | 29.52 | 1.40 | 37.33 | 61.14 |
| 102 | 30.27 | 2.04 | 39.11 | 58.83 |
| 102 | 28.11 | 2.08 | 36.42 | 61.58 |
| 102 | 26.31 | 1.97 | 36.90 | 61.07 |
| 103 | 24.40 | 1.65 | 37.14 | 61.39 |
| 103 | 25.75 | 3.45 | 35.34 | 61.20 |
| 104 | 32.06 | 2.33 | 33.21 | 64.44 |
| 105 | 34.89 | 4.58 | 35.02 | 60.39 |
| 106 | 27.86 | 2.04 | 33.38 | 64.37 |
| 106 | 29.53 | 2.05 | 34.54 | 63.39 |
| 107 | 27.93 | 3.56 | 36.23 | 60.15 |
| 107 | 31.21 | 1.84 | 33.38 | 65.74 |
| Average | 29.14 | 2.32 | 36.73 | 60.99 |

Analyses of two lots of milk powder were also made by a chromatographic method to compare the values obtained when the sodium hydroxide is with an absolute ethyl alcohol or with 99% isopropyl alcohol, respectively, as to whether the results obtained are comparable regardless of the alcohol used, and such results are given in Table II.

*Table II*

| Lot No. | Solvent Alcohol | (cc. of NaOH) Value for total acids | Percentages of fatty acids | |
|---|---|---|---|---|
| | | | Percent butyric acid | Percent $C_6$ and higher acids |
| 98 | ethyl | 33.23 | 35.15 | 63.45 |
| 98 | isopropyl | 28.69 | 40.92 | 57.44 |
| 98 | do | 31.23 | 41.05 | 56.90 |
| 102 | ethyl | 23.84 | 35.56 | 62.10 |
| 102 | do | 25.26 | 34.11 | 63.30 |
| 102 | isopropyl | 30.27 | 39.11 | 58.83 |
| 102 | do | 28.11 | 36.42 | 61.58 |
| 102 | do | 26.31 | 36.90 | 61.07 |
| Average | | 28.41 | 37.10 | 60.58 |

It is thus apparent that the present processes, respectively, produce an enzyme-containing powder from only approved edible materials, that only simple equipment of known construction is required (all of such equipment having long been approved for use in food preparation), that the enzyme powder is readily standardized, that the enzyme powder is stable for longer periods than will likely be required for storage and that the effect of the enzyme powder in materials susceptible to action of its enzyme, can be easily calculated and controlled.

The whole milk powder modified by use of enzyme powder, also requires only equipment available in most milk handling plants, the process steps for making the milk powder are individually known and are relatively simple and non-critical, the milk powder obtained is stable for longer periods of time than such powder is likely to be stored, and the milk powder is easily standardized to a given quality.

The whole milk powder has a higher proportion of the $C_6$ and higher fatty acids than of the $C_4$ and lower fatty acids and any desired intensity of flavor may be produced by use of different quantities of such milk powder. The flavor produced, insofar as can be determined by various "tasting panels" is in a straight line which is dependent on the proportions of the present whole milk powder used but increases sharply in intensity upon use of 2.5–10.0% of the weight of finished product, which is sufficient to dominate most of the other flavor components in even such compositions as chocolate, salad dressings and other highly flavored foods.

Particular attention is directed to the fact that the group of $C_4$ and lower acids are much more than one-half of all of the acids, that butyric acid is by far the larger proportion of the group of $C_4$ and lower acids, and especially that butyric acid is more than one-third of all of the acids or more than one-half of the entire quantity of the group of $C_6$ and higher acids. From factory test runs and commercial use of over 100,000 pounds of the present milk powder by a large number of manufacturers of several different food products and who have experience in use of a milk powder, it appears that each of the above factors is significant. It is however now believed that the importance of the above factors in obtaining the desired flavors, is in the order above given and that the ratio of butyric acid to the group of $C_6$ and higher acids, is by far the most important of the factors.

The flavor produced is stable and does not change on aging so long as the foods are preserved from general deterioration, resulting in development of high proportions of undesirable flavor components.

I claim:

1. In a process for making an enzyme-containing powder, the steps of grinding fresh edible tissues from between the base of the tongue and the trachea of milk-fed animals, mixing the ground meat with an equal weight of milk powder, drying the mixture at not more than 110° F. to remove up to 40% of water therefrom, and pulverizing the dried mixture to the particle size usual in milk powder.

2. In a process for making an enzyme-containing powder, the steps of grinding fresh edible tissues taken from between the base of the tongue and the trachea of milk-fed animals to a particle size passing ¼–½ inch openings in a grinder plate, mixing the ground meat with an equal weight of skim milk powder, drying the mixture at not more than 110° F. to remove up to 40% of water therefrom, and pulverizing the dried mixture to the particle size usual in milk powder.

3. In a process for making an enzyme-containing powder, the steps of grinding fresh edible tissues taken from between the base of the tongue and the trachea of milk-fed animals, mixing the ground meat with an equal weight of milk powder, drying the mixture at a temperature range of 105–110° F. with sufficient air circulation to keep the temperature of the mixture substantially uniform to remove up to 75% of the original weight of the tissues as water, and pulverizing the dried mixture to the particle size usual in milk powder.

4. In a process for making an enzyme-containing powder, the steps of grinding fresh edible tissues from between the base of the tongue and the trachea of milk-fed animals, mixing the ground tissues with an equal weight of milk powder, chopping the mixture for reducing the size of the meat particles and for further mixing the meat and the milk powder, drying the mixture at not more than 110° F. to remove up to 40% water therefrom, and pulverizing the dried mixture to a particle size passing a 60 mesh screen.

5. The product prepared by the process of claim 4.

6. In a process for producing an enzyme-modified milk powder, the steps of condensing milk to 30–38% total solids, heating the milk at temperatures up to 170° F. for sufficient time to destroy the natural enzymes therein, homogenizing the milk at a pressure approximately one-fourth of the normal homogenizing pressures and at a temperature up to 135° F. to keep the butter-fat liquid, bringing the milk to an incubation temperature of approximately 115° F. suspending in water at the incubation temperature an enzyme-containing powder in sufficient quantity to increase acidity in the milk up to the equivalent of 2–3 cc. of N/20 sodium hydroxide per gallon of total milk solids, mixing the homogenized milk and the enzyme powder suspension at the incubation temperature, determining the acidity of the mixture, incubating the mixture to reach an increase in acidity equivalent to the said amount of sodium hydroxide total fatty acids, heating the mixture at a temperature up to 150° F. and for a sufficient time to inactivate the enzymes, homogenizing the mixture at the normal pressure for homogenizing milk, cooling the mixture to approximately 50° F. at which agglomeration of the butter-fat is avoided regardless of the total fatty acids content of the mixture, and spray-drying the mixture at a temperature retaining the milk solids in unaltered condition.

7. In a process for producing an enzyme-modified milk powder, the steps of condensing the milk to approximately 36% total solids, heating the milk up to 170° F. to destroy the natural enzymes therein, homogenizing the milk at approximately 500 p. s. i. and at a temperature up to 135° F. to keep the butter-fat liquid, bringing the milk to an incubation temperature of approximately 115° F., suspending in water at the incubation temperature an enzyme-containing powder in quantity to produce a total acidity in the milk equivalent to 2.33 cc. N/20 sodium hydroxide per gram of total milk solids only, mixing the homogenized milk and enzyme suspension at the incubation temperature, incubating the mixture at approximately 115° F. for up to 48 hours to reach the given value of total acids, heating the mixture up to 150° F. and for a sufficient time to inactivate the enzymes, homogenizing the mixture at high pressures, cooling the mixture to approximately 50° F., drying the mixture at temperatures up to 50° F. for retaining the milk solids in their original condition, and cooling the enzyme powder before packaging to a temperature up to 100° F. for preventing damage of the packed powder.

8. In a process for producing an enzyme-modified milk powder, the steps of condensing milk to 30–38% total solids, heating the milk at temperatures up to 170° F. for destroying the natural enzymes therein, homogenizing the milk at a pressure approximately one-fourth of the normal homogenizing pressures and at a temperature up to 135° F. to keep the butter-fat liquid, bringing the milk to an incubation temperature of approximately 115° F., suspending in water at the incubation temperature an enzyme-containing powder in the quantity of less than 1 lb. per 100 lbs. of condensed milk to increase acidity in the milk up to the equivalent of 2 to 3 cc. of N/20 sodium hydroxide per gram of total milk solids, mixing the homogenized milk and the enzyme powder suspension at the incubation temperature, determining the acidity of the mixture, incubating the mixture to reach an increase in acidity equivalent to the said amount of sodium hydroxide in total fatty acids, heating the mixture at a temperature up to 150° F. to inactivate the enzymes, homogenizing the mixture at the normal pressure for homogenizing milk, cooling the mixture to approximately 50° F. at which agglomeration of the butter-fat is avoided, regardless of the total fatty acids content of the mixture, and spray-drying the mixture at a temperature retaining the milk solids in unaltered condition.

9. The product of the process of claim 7, in which the butyric acid is increased to 30–40% of total acids and the C₆ and higher fatty acids are increased to 60–65% of total acids, the powder containing no more than 4% moisture.

References Cited in the file of this patent

UNITED STATES PATENTS

| 1,866,633 | Ehrenreich | July 12, 1932 |
| 2,322,148 | Lane et al. | June 15, 1943 |
| 2,370,878 | Roundy et al. | Mar. 6, 1945 |
| 2,370,379 | Roundy et al. | Mar. 6, 1945 |
| 2,531,329 | Farnham | Nov. 21, 1950 |

OTHER REFERENCES

Journ., Dairy Science, Apr. 1943, pages 331–336, by Babel et al.